(12) United States Patent
Sohl et al.

(10) Patent No.: US 11,913,171 B2
(45) Date of Patent: Feb. 27, 2024

(54) TECHNICAL ROLL, IN PARTICULAR FOR PAPER MANUFACTURING, METHOD FOR INTRODUCING A POLYMER FIBRE INTO AN EMPTY CONDUIT OF A TECHNICAL ROLL, AND USE OF A POLYMER FIBRE

(71) Applicant: SchäferRolls GmbH & Co. KG, Renningen (DE)

(72) Inventors: Carsten Sohl, Fredericia (DK); Michail Nedanov, Renningen (DE)

(73) Assignee: SCHÄFERROLLS GMBH & CO. KG, Renningen (DE)

( * ) Notice: Subject to any disclaimer, the term of this patent is extended or adjusted under 35 U.S.C. 154(b) by 0 days.

(21) Appl. No.: 17/582,449

(22) Filed: Jan. 24, 2022

(65) Prior Publication Data

US 2022/0145540 A1    May 12, 2022

Related U.S. Application Data

(63) Continuation of application No. PCT/EP2020/070947, filed on Jul. 24, 2020.

(30) Foreign Application Priority Data

Jul. 24, 2019 (DE) .................... 10 2019 120 052.0

(51) Int. Cl.
*D21G 1/02* (2006.01)
*D21F 3/08* (2006.01)

(52) U.S. Cl.
CPC ............. *D21G 1/0233* (2013.01); *D21F 3/08* (2013.01)

(58) Field of Classification Search
CPC ........... D21G 1/02; D21G 1/0233; G01L 5/00
See application file for complete search history.

(56) References Cited

U.S. PATENT DOCUMENTS

| 3,184,828 | A |   | 5/1965 | Dames, Jr. |
| 4,693,553 | A | * | 9/1987 | Sasaki .................... G02B 1/046 385/145 |
| 6,129,652 | A |   | 10/2000 | Wenzel et al. |

(Continued)

FOREIGN PATENT DOCUMENTS

| CN | 102203576 A | 9/2011 |
| CN | 104040072 A | 9/2014 |

(Continued)

OTHER PUBLICATIONS

International Search Report issued for PCT/EP2020/070947 dated Oct. 21, 2020.

(Continued)

*Primary Examiner* — Jason L Vaughan
(74) *Attorney, Agent, or Firm* — REISING ETHINGTON P.C.

(57) ABSTRACT

A technical roll, in particular for paper manufacturing, having an elongated roll core and at least one first covering which is provided on the roll core, wherein an empty duct or conduit is provided, which is suitable for receiving a polymer fibre and extends over the length of the roll such that the polymer fibre can be introduced at one end of the empty duct. The application also relates to a technical roll having a polymer fibre, to a method for introducing the polymer fibre into an empty duct, and to the use of a polymer-based optical waveguide as a sensor in a technical roll.

22 Claims, 3 Drawing Sheets

(56) References Cited

U.S. PATENT DOCUMENTS

| | | | | |
|---|---|---|---|---|
| 6,441,904 | B1* | 8/2002 | Shakespeare | G01N 33/346 356/429 |
| 7,077,566 | B2* | 7/2006 | Rajendran | G01K 11/3206 374/161 |
| 7,495,207 | B2* | 2/2009 | Ogura | G01J 5/602 359/334 |
| 7,542,644 | B2* | 6/2009 | Tanaka | C03C 25/1065 385/114 |
| 9,302,871 | B2 | 4/2016 | Breineder et al. | |
| 10,569,280 | B2* | 2/2020 | Busenhart | B02C 4/02 |
| 11,065,626 | B2* | 7/2021 | Reiter | H02J 50/10 |
| 2001/0032924 | A1 | 10/2001 | Pramila et al. | |
| 2003/0181303 | A1 | 9/2003 | Leinonen et al. | |
| 2007/0281157 | A1* | 12/2007 | Laney | G02B 5/0257 428/375 |
| 2011/0226070 | A1 | 9/2011 | Berendes et al. | |
| 2013/0345035 | A1 | 12/2013 | Berendes et al. | |
| 2014/0374460 | A1* | 12/2014 | Breineder | B65H 43/00 492/9 |
| 2016/0010284 | A1* | 1/2016 | Breineder | D21F 3/10 162/231 |
| 2016/0107162 | A1* | 4/2016 | Busenhart | B02C 4/32 241/25 |
| 2019/0240672 | A1* | 8/2019 | Reiter | B02C 4/30 |

FOREIGN PATENT DOCUMENTS

| | | |
|---|---|---|
| DE | 1504702 A1 | 10/1969 |
| DE | 19635845 C1 | 6/1998 |
| DE | 202008014477 U1 | 1/2009 |
| DE | 202012012490 | 2/2013 |
| JP | H04172402 A | 6/1992 |
| JP | 2003173097 A | 6/2003 |
| KR | 20080041803 A | 5/2008 |
| WO | WO2006031106 A1 | 3/2006 |
| WO | WO2012113747 A1 | 8/2012 |
| WO | WO2013104600 A1 | 7/2013 |
| WO | WO2015181155 A1 | 12/2015 |

OTHER PUBLICATIONS

Office action issued by the German Patent Office for DE 10 2019 120 052.0 dated Mar. 4, 2020.

International Preliminary Report on Patentability issued for PCT/EP2020/070947 dated Jan. 25, 2022.

Office action issued by the The China National Intellectual Property Administration(CNIPA) for application CN 202080053439.4 dated Aug. 28, 2023.

* cited by examiner

TECHNICAL ROLL, IN PARTICULAR FOR PAPER MANUFACTURING, METHOD FOR INTRODUCING A POLYMER FIBRE INTO AN EMPTY CONDUIT OF A TECHNICAL ROLL, AND USE OF A POLYMER FIBRE

CROSS REFERENCES TO RELATED APPLICATIONS

This application is a continuation of international patent application PCT/EP2020/070947 filed on Jul. 24, 2020 and published in the German language as WO 2021/013987 A1, which claims priority from German patent application DE 10 2019 120 052 filed on Jul. 24, 2019.

BACKGROUND

The present application relates to a technical roll, in particular for papermaking, having an elongated roll core and at least one first cover, which is provided on the roll core. The application also relates to a method for introducing a polymer fiber into an empty conduit of a technical roll, and the use of a polymer-based optical waveguide as a sensor in a technical roll.

In many different technical areas, in particular the paper industry, rolls having single-layer or multilayer covers are used. These single-layer or multilayer covers can be rubber covers, composite covers or polyurethane covers, to name only the most important.

During the operation of such rolls, various parameters, such as the temperature in the roll or pressure loadings acting on the roll surface, are of importance for the optimum setting of the respective system. If these parameters are known, it is possible, for example, to adjust the so-called nip between two interacting rolls very well.

The detection of these parameters is very complicated, however, and is possible only with difficulty during real-time operation of the system. There are solutions in the prior art in which one or more sensors are integrated in the roll in a fixed location and detect appropriate parameters. Such sensors are provided during the manufacture of the roll and before the application of the cover. As a rule, they are provided on the roll core.

The disadvantage of such solutions is to be seen in the fact that the manufacturing method is very complicated and the thermal loading for the sensors during the application of the covers is very high. Furthermore, rolls that are already in use cannot be retrofitted with sensors.

SUMMARY

Against this background, one of the objects of the present application is to develop a technical roll of the aforementioned type in such a way that its manufacture is very simple and it can also retrospectively be equipped with sensors.

This object may be achieved by the technical roll mentioned at the outset in that an empty conduit is provided which is suitable for receiving a polymer fiber and extends over the length of the roll in such a way that the polymer fiber can be introduced at one end of the empty conduit.

This means, in other words, that the roll may be manufactured in the usual way, an empty conduit being provided only during the application of the cover. The outlay for this is very low. Following the fabrication of the roll, a polymer fiber can then be introduced into the empty conduit. Such a polymer fiber may be a specific polymer-based optical fiber, as is disclosed in WO 2015/1811551, for example. Such a polymer fiber is used as a sensor for detecting different parameters, in particular temperature and pressure.

With the aid of this polymer fiber and a detection device to be provided accordingly, the aforementioned parameters can be detected during the operation of the roll and transmitted for further evaluation, for example to a computer.

It has transpired that this solution according to the present application may permit very cost-effective manufacturing of the roll, since only an empty conduit has to be provided. The previous manufacturing sequence is changed only insubstantially as a result. By means of the empty conduit provided, the installation of the sensors in the form of the polymer fibers and corresponding electronic components can then be retrofitted at any desired later time.

The object is thus completely achieved.

In a preferred embodiment, the empty conduit is arranged outside the roll core.

This measure has the advantage that manufacturing is more beneficial, since the roll core itself does not have to be machined.

In a preferred embodiment, a plurality of covers or layers are provided on the roll core, wherein the first cover forms the outer cover (top layer) and the empty conduit is arranged between the roll core and the outer cover.

This has the advantage that the empty conduit and therefore also the polymer fiber to be introduced later is at only a small distance from the roll surface, so that, in particular, the compressive forces acting on the roll surface can be detected better.

In a preferred embodiment, the empty conduit is matched to the polymer fiber in such a way that the polymer fiber rests on the inner side of the empty conduit. Preferably, the empty conduit has an internal diameter of 300 µm to 600 µm, preferably 400 µm to 500 µm, and more preferably 425 µm.

The detection of the parameters may be improved considerably if the polymer fiber rests closely on the inner wall of the empty conduit.

In a preferred embodiment, the empty conduit extends over the entire length of the cover, and both ends of the empty conduit are accessible from outside.

This has the advantage that the introduction of the polymer fiber is easier if both ends of the empty conduit are accessible from outside.

In a preferred embodiment, the empty conduit is manufactured from a plastic, in particular a co-polyester or a polyamide.

This material has proven to be particularly advantageous.

In a preferred embodiment, a plurality of empty conduits are provided, which are preferably distributed uniformly in the circumferential direction of the roll.

The use of a plurality of empty conduits permits the use of a plurality of polymer fibers, which are able to supply a plurality of measured values per revolution of a roll and therefore permit improved evaluation.

In a preferred embodiment, the empty conduit extends parallel to the longitudinal axis of the roll. This means, in other words, that the empty conduit and the longitudinal axis of the roll lie in one plane.

Alternatively, it is also conceivable to provide the empty conduit at an angle to the longitudinal axis.

Preferably, the roll has a length of several meters and a maximum length of up to 12 m.

An object on which the present application is based is also achieved by a method for introducing a polymer fiber into an empty conduit of a technical roll, as was previously described by way of example, wherein the method has the following steps:

providing a polymer fiber with a leading end,
introducing the leading end of the polymer fiber into the empty conduit at one end of the latter,
applying a vacuum to the other end of the empty conduit or applying compressed air to the end of the empty conduit, and
leading the polymer fiber through the empty conduit via the applied vacuum or the applied compressed air.

An advantage of this method is to be seen in the fact that the introduction of the polymer fiber into the empty conduit following the production of the roll is done with little effort. By means of the vacuum applied to one end or the compressed air, the polymer fiber can be "sucked" or "blown" through the empty conduit, so that the danger of damage to the polymer fiber is also very low.

Preferably, the polymer fiber is provided with an adhesive before being introduced into the empty conduit in such a way that there are no or virtually no clearances between the polymer fiber and the inner side of the empty conduit. Alternatively, it is also conceivable to inject the adhesive following the introduction of the polymer fiber.

This measure has an advantage that the detection quality is improved, since, via the adhesive, the polymer fiber has large-area contact with the empty conduit and the transmission of the temperature or the compressive forces is very good.

An object on which the present application is based may also be achieved by a technical roll of the type mentioned at the outset in that a sensor which is embodied as a polymer-based optical waveguide, polymer fiber, is provided and extends inside the roll and outside the roll core.

This means, in other words, that the technical roll differs from the previously described technical roll in that the polymer fiber is provided directly in the roll cover, without the use of an empty conduit.

Although this solution may no longer permit retrospective fitting with a sensor, the manufacture of such a roll with a polymer fiber is also considerably simpler than the sensor solutions known from the prior art in a roll.

In a preferred embodiment, the polymer fiber extends over the entire length of the roll.

This has the advantage that parameters become detectable along the entire length of the roll.

In a preferred embodiment, a measuring device is provided, which is designed to couple light into the polymer fiber and to detect reflected light out of the polymer fiber as a measured value. The measuring device preferably has an evaluation unit, which determines one or more parameters, preferably pressure, temperature or moisture content, from one or more detected measured values.

In a preferred embodiment, the polymer fiber has at least one measuring point, preferably a plurality of measuring points distributed in the longitudinal direction.

This means, in other words, that a plurality of parameters can be detected along the length of the polymer fiber and therefore at different locations of the roll.

In a preferred embodiment, the measuring device has a transmission unit which is designed to transmit the measured values and/or the determined parameters in a wire-free manner to a central unit, for example a computer, for further processing.

This measure has an advantage that the data transmission is possible very simply, since no lines are required from the roll to a central unit.

In a preferred embodiment, instead of or in addition to a battery, an energy recovery unit may be provided, which supplies the measuring device with energy. Preferably, the energy recovery unit generates energy as a result of the rotation of the roll, preferably by induction. More preferably, the energy recovery unit has a rechargeable battery, which stores or temporarily stores the recovered energy.

This measure has an advantage that the measuring device is energy-autonomous, and therefore needs no power supply from outside or in the form of a battery (for example as an interchangeable battery or rechargeable battery). Sufficient energy can be generated by the rotation of the roll during operation in order to supply the electronic components in the measuring device with the required energy.

In a preferred development, an empty conduit is provided, in which the polymer fiber extends.

An object on which the present application is based is also achieved by using a polymer-based optical waveguide, as specified in WO 2015/1811551, as a sensor in a technical roll for detecting at least one parameter, preferably a pressure acting in the radial direction at a defined location of the roll, wherein the waveguide extends within the roll and has at least one measuring point, preferably a plurality of measuring points.

It goes without saying that the features mentioned above and those still to be explained below can be used not only in the respectively indicated combination but also in other combinations or on their own without departing from the scope of the present invention.

BRIEF DESCRIPTION OF THE FIGURES

Further advantages and refinements of the present application emerge from the description and the appended drawings, in which.

DESCRIPTION OF PREFERRED EMBODIMENTS

Figure 1:
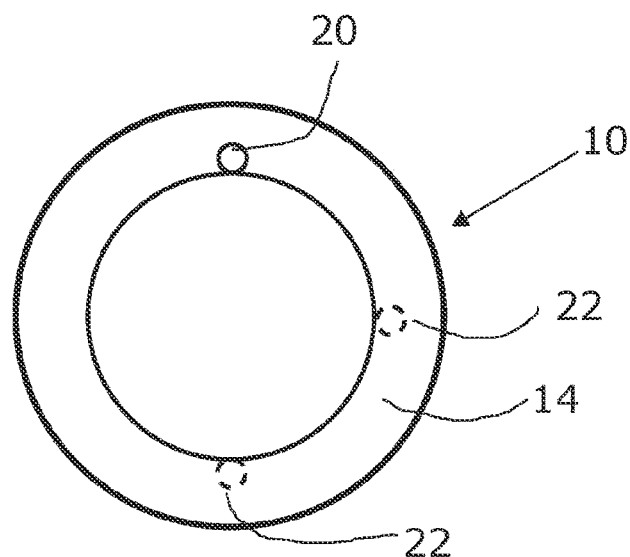
FIG. 1 shows a schematic illustration of a technical roll with a cover.
Figure 2:
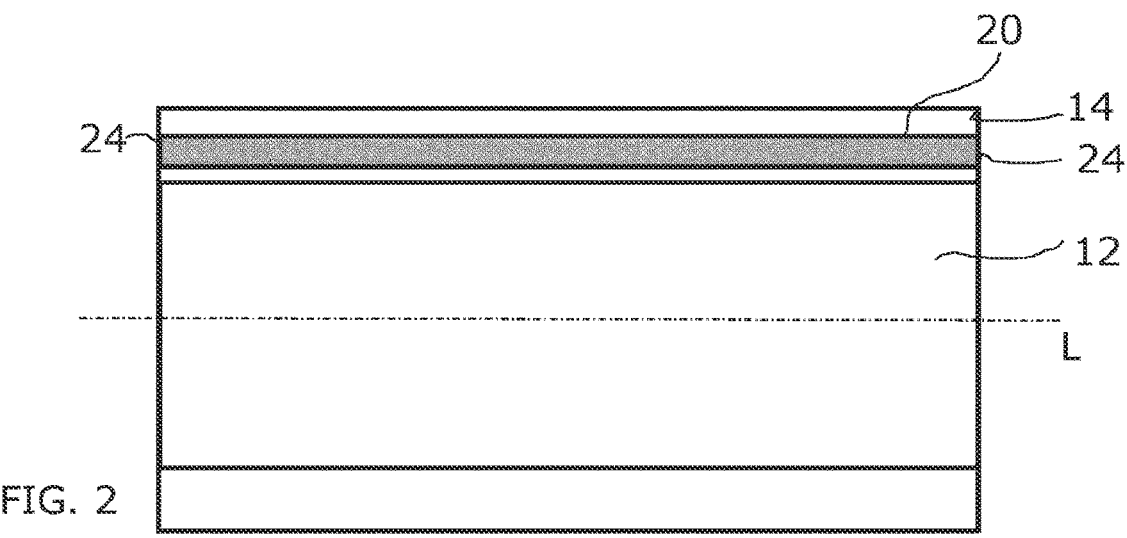
FIG. 2 shows a schematic illustration of the roll from FIG. 1 in a longitudinal view.

A technical roll is illustrated in FIG. 1 in a highly simplified form in a front view and is identified by the reference numeral 10. The corresponding illustration in a longitudinal view is illustrated in FIG. 2.

Such technical rolls are used in an extremely wide range of application areas, for example in papermaking, in tissue manufacturing, paper or tissue further processing or film manufacturing. Technical rolls of this type are also used, among other things, as suction press rolls, press rolls, film press rolls, multi-nip rolls, soft rolls, super rolls, embossing calendar rolls, central press rolls, guide rolls, size press rolls or coater rolls, to mention only some by way of example.

Figure 3:
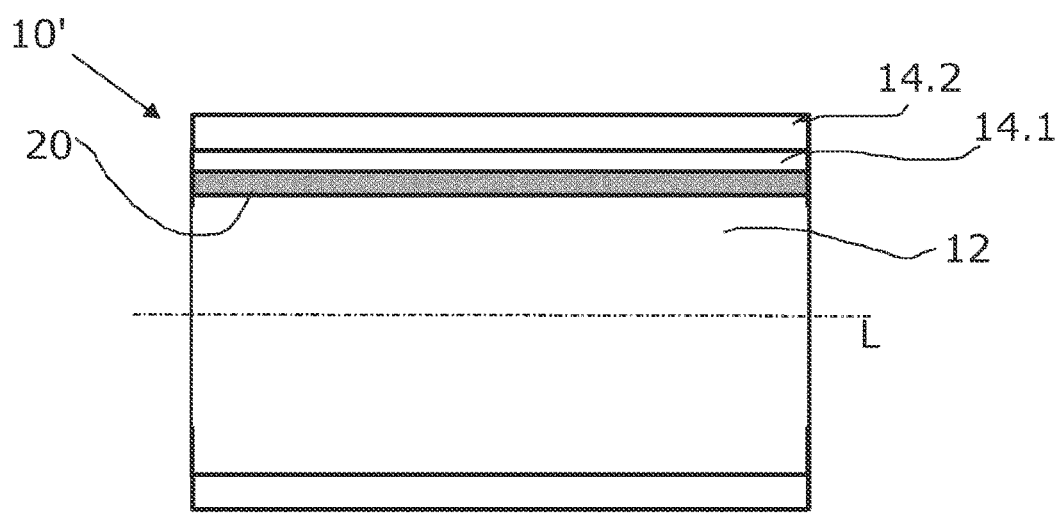
FIG. 3 shows a schematic illustration of a roll having a plurality of covers in a longitudinal view.

In general, such a technical roll 10 has a roll core 12 made of metal and at least one coating 14, which is also designated as cover 14. In FIG. 1, the roll 10 is illustrated with a single-layer cover 14, however, multilayer covers 14 may also be used in many applications. One example of a two-layer cover having two layers 14.1 and 14.2 is illustrated by way of example in FIG. 3. It goes without saying that three or more layers can also be provided.

The cover 14 of the roll 10 can be built up from a rubber material, a composite material or a polyurethane material. Combinations of these materials in multilayer covers are also conceivable.

The roll 10 shown in FIG. 1 has at least one empty conduit 20, preferably also further empty conduits 22, which extend over the entire length of the roll 10 and are provided adjacent the roll core 12 in the region of the cover 14. The empty conduit 20 is preferably manufactured from a plastic material and has an internal diameter of 300 µm to 600 µm, preferably 425 µm. It is used to accommodate a polymer fiber 30, which will be explained further in detail below.

The empty conduit 20 has two open ends 24, which are accessible from outside at the respective ends of the roll 10. This means, in other words, that the polymer fiber can be introduced into the appropriate opening 24 in the empty conduit 20 from one of the two ends.

The empty conduit 20 can be provided in a simple way during the application of the cover 14 to the roll core 12. Particularly complicated manufacturing steps are not necessary for this purpose. Care must merely be taken that the material of the empty conduit 20 withstands the thermal conditions during the application of the cover 14. Furthermore, it is important when choosing the material for the empty conduit 20 that it is a flexible material which can deform under the compressive forces to be measured.

Figure 4:
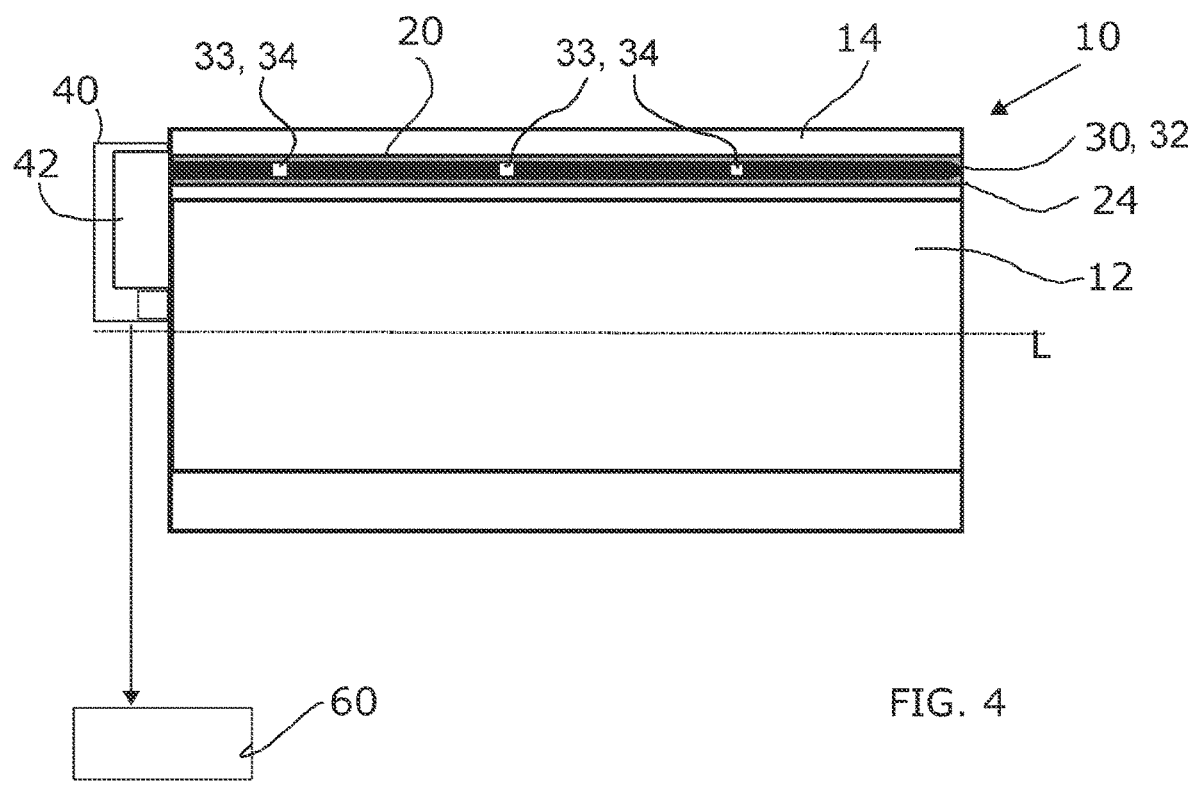
FIG. 4 shows a schematic illustration of the roll according to FIG. 2 with an inserted polymer fiber and attached detection device.

In FIG. 4, the technical roll 10 from FIG. 2 is now illustrated, a polymer fiber 30 being located in the empty conduit 20.

The polymer fiber 30 is used as an optical sensor 32 for measuring various parameters, such as, for example, moisture content, pressure and/or temperature. The polymer fiber 30 may be a polymer-based optical waveguide structure, which has one or more reflection structures 33 (for example in the form of interferometric reflection points) distributed in the longitudinal direction, wherein the various parameters can be detected on these lattice structures. The reflection structures consequently define the measuring points 34 along the polymer fiber.

The precise structure of an example of such a polymer-based optical waveguide structure, called polymer fiber for short, is described in the document WO 2015/181155A1. The disclosure content thereof, in particular with regard to the structure of the polymer fiber, is hereby incorporated completely by reference in the present description. Such a polymer fiber is offered by the company Shute, 3490 Kvistgaard, Denmark.

The measurement of the various aforementioned parameters is carried out by light being coupled into the polymer fiber, and by the light reflected at the lattice structures, i.e. measuring points, being detected. Depending on the aforementioned parameters, which are present at the various positions in the longitudinal direction of the lattice structures, the light is reflected differently, so that conclusions can be drawn about the parameters at the measuring points via this connection. The local resolution of the various measuring points which are predefined by the lattice structures is carried out via the different propagation times of the reflected light.

The inventors have surprisingly established that the compressive forces acting on the roll surface can be detected very well via the polymer fiber 30, although the polymer fiber is not located in the immediate vicinity of the roll surface but at a certain distance from the roll surface.

A measurement of the parameters is thus possible during operation of the roll, wherein, in the best case, one or more measured values can be supplied during each revolution depending on the reflection structure (or the number of reflection points). Usually, however, the measured values are not detected during each revolution but at an interval of a plurality of revolutions, if appropriate also staggered over time in the longitudinal direction of the roll. This means, in other words, that the measured values at the various measuring points of the polymer fiber are detected at different revolution times. Of course, it is also possible for all the measured values from the various measuring points to be detected per revolution.

To couple the light in and to detect the reflected light, a detection device 40 is provided at one end of the roll 10, as shown in FIG. 4.

Figure 5:
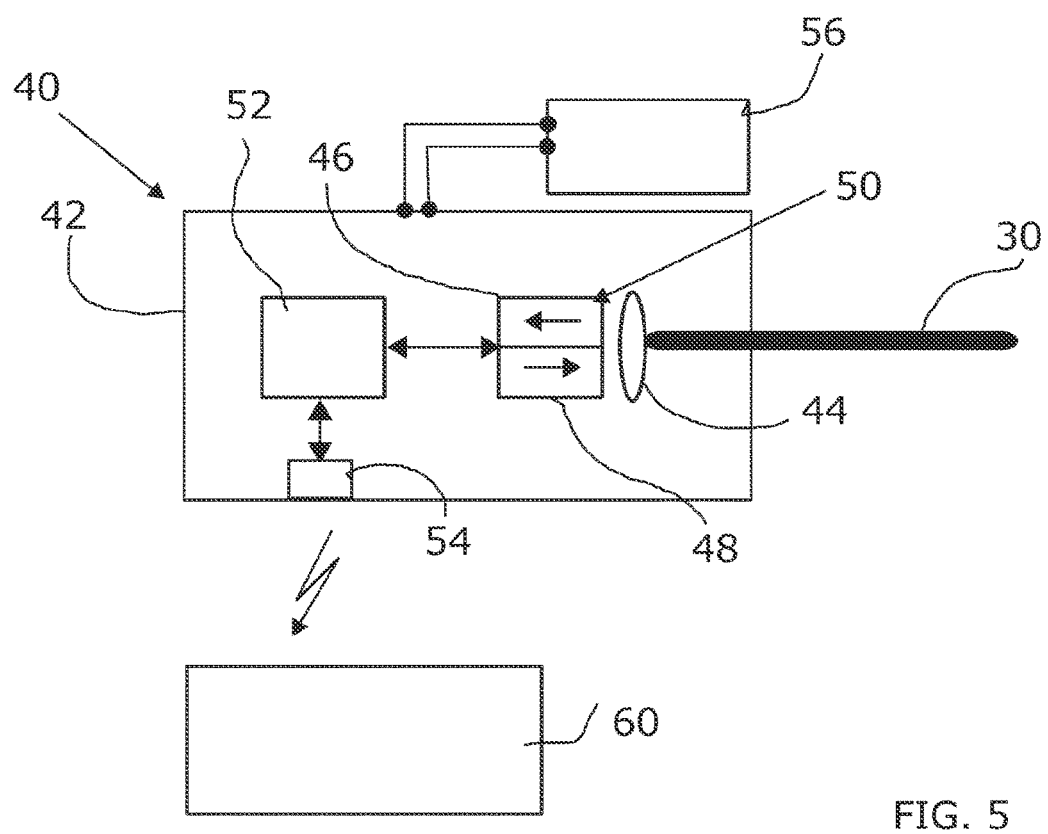
FIG. 5 shows a schematic block diagram of the detection device.

As illustrated in FIG. 5, the detection device 40 has a measuring unit 42 which, for example, comprises an optical lens 44, by which the light generated by an optical emitter 48, for example an LED, is coupled into the polymer fiber 30 and the reflected light is fed to an optical sensor 46, for example in the form of a photodiode or a phototransistor or an optical spectrometer. However, it should be mentioned at this point that an optical lens is not necessarily required to couple the light in. The optical sensor 46 and the optical emitter 48 can also be provided in the form of a laser diode unit 50. In recent times, laser diodes which can carry out both functions, namely of emitting light and detecting reflected light, have been obtainable.

The laser diode unit 50 is connected to an evaluation unit 52, which performs the control of the laser diode unit and evaluates the corresponding received measured signals. The evaluated measured signals are transported from the evaluation unit 52 to a transmission unit 54, which transmits the data in a wire-free manner, for example via Wi-Fi or Bluetooth technology, to a computer 60. There, the measured data are then available for further evaluation.

The energy supply of the measuring unit 42 is preferably provided autonomously via an energy recovery unit 56.

The energy recovery unit 56 contains a rechargeable battery, which is used to temporarily store recovered electrical energy. Electrical energy can be recovered through the rotation of the roll 10 during operation for example inductively. With this solution, cables to the detection device 40 for the energy supply can be avoided.

By equipping the roll 10 with one or more polymer fibers 30, different parameters can be detected and evaluated during the operation of the roll. These parameters have various uses. Thus, for example, as a result of the evaluation of the measured parameters, the nip can be adjusted very well. In addition, conclusions about the wear of the cover 14 can be derived from the measured parameters.

The sensors described, comprising the detection device and polymer fiber 30, can be retrofitted at any time in a roll 10 with an existing empty conduit 20. This has the potential advantage that the customer can initially acquire a technical roll without any sensors and can then retrofit the sensors later. The outlay for the retrofitting is low, since it is merely necessary to introduce the polymer fiber 30 into the empty conduit 20 and to attach the corresponding detection device 40 to the end of the roll.

Figure 6:
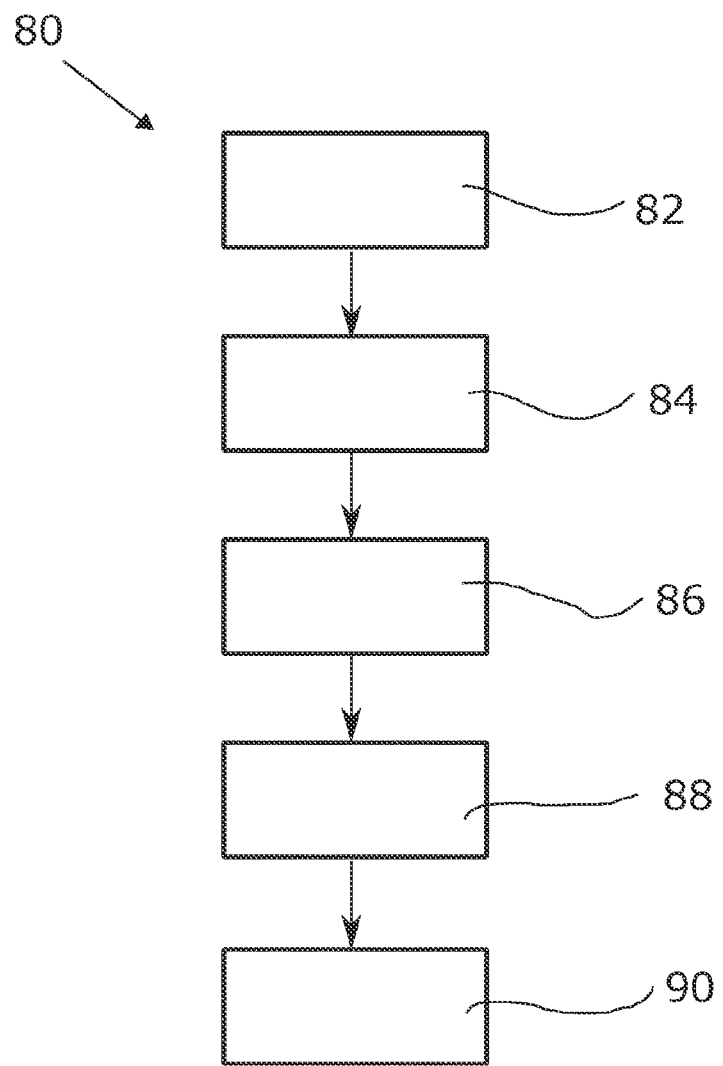
FIG. 6 shows a block diagram to explain the method.

To introduce the polymer fiber 30 into the empty conduit 20, firstly the polymer fiber is supplied and provided with an adhesive, steps 82 and 84 in FIG. 6.

The leading end of the polymer fiber is then introduced into the opening 24 of the empty conduit at one end, step 86.

At the opposite end of the roll 10, a suction device is attached in the region of the opening 24 of the empty conduit 20, in order to produce a vacuum in the empty conduit 20. Since, on the opposite side, the polymer fiber 30 together with the applied adhesive seals off the corresponding opening 24, the vacuum in the empty conduit 20 ensures that the polymer fiber 30 is drawn through the empty conduit 20, steps 88 and 90. Alternatively, a compressed air device is attached to the end of the roll 10 in order, so to speak, to "blow" the polymer fiber 30 through the empty conduit.

It can be seen that this process of introducing the polymer fiber 30 is possible without great effort. It is preferable that the polymer fiber 30 together with the adhesive achieves the greatest full-area contact with the inner side of the empty conduit, so that, in subsequent operation, it is also ensured that the compressive forces acting on the empty conduit are transferred directly to the polymer fiber.

Overall, it is evident that the present application permits a considerably improved technical roll which can very easily be equipped or retrofitted with very flexibly insertable sensors.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A technical roll, in particular for papermaking, having:
    an elongated roll core,
    at least one first cover, which is provided on the roll core, and
    an empty conduit, which is suitable for receiving a polymer fiber and extends over an entire length of the technical roll in such a way that the polymer fiber can be introduced at one end of the empty conduit.

2. The technical roll as claimed in claim 1, wherein the empty conduit is arranged outside the roll core.

3. The technical roll as claimed in claim 1, wherein a plurality of covers are provided on the roll core, wherein the first cover forms an outer cover and the empty conduit is arranged between the roll core and the outer cover.

4. The technical roll as claimed in claim 1, wherein the empty conduit has an inner side with an inner diameter that corresponds to an outer diameter of the polymer fiber such that the polymer fiber rests closely on the inner side of the empty conduit.

5. The technical roll as claimed in claim 1, wherein the empty conduit has an internal diameter of 300 µm to 600 µm.

6. The technical roll as claimed in claim 1, wherein the empty conduit extends over an entire length of the cover and both ends of the empty conduit are accessible from outside.

7. The technical roll as claimed in claim 6, wherein the empty conduit is manufactured from a co-polyester or polyamide.

8. The technical roll as claimed in claim 1, wherein a plurality of empty conduits are provided.

9. The technical roll as claimed in claim 1, wherein the empty conduit extends parallel to a longitudinal axis (L) of the roll.

10. The technical roll as claimed in claim 1, wherein the empty conduit extends at an angle to the longitudinal axis (L) of the roll.

11. The technical roll as claimed in claim 1, wherein the technical roll has a length of up to 12 m.

12. A technical roll, in particular for papermaking, having:
    a roll core,
    at least one cover, and
    a sensor, which is formed as a polymer-based optical waveguide, polymer fiber, and extends inside the technical roll and outside the roll core.

13. The technical roll as claimed in claim 12, wherein the polymer fiber extends over an entire length of the technical roll.

14. The technical roll as claimed in claim 12, wherein a measuring device is provided, which is designed to couple light into the polymer fiber and to detect reflected light out of the polymer fiber as a measured value.

15. The technical roll as claimed in claim 14, wherein the measuring device has an evaluation unit, which determines one or more parameters selected from the group of pressure, temperature or moisture content, from one or more detected measured values.

16. The technical roll as claimed in claim 12, wherein the polymer fiber has at least one measuring point.

17. The technical roll as claimed in claim 12, wherein a measuring device has a transmission unit, which is designed to transmit measured values and/or determined parameters in a wire-free manner to a central unit for further processing.

18. The technical roll as claimed in claim 12, wherein an energy recovery unit is provided, which supplies a measuring device with energy.

19. The technical roll as claimed in claim 18, wherein the energy recovery unit generates energy as a result of rotation of the technical roll by way of induction.

20. The technical roll as claimed in claim 19, wherein the energy recovery unit has a rechargeable battery, which stores the recovered energy.

21. The technical roll as claimed in claim 12, wherein an empty conduit is provided, in which the polymer fiber extends.

22. The technical roll as claimed in claim 12, wherein a polymer-based optical waveguide is used as a sensor in the technical roll for detecting at least one parameter, wherein the optical waveguide extends within the technical roll and has at least one measuring point.

* * * * *